(12) United States Patent
Ishikawa et al.

(10) Patent No.: US 11,715,987 B2
(45) Date of Patent: Aug. 1, 2023

(54) MOTOR WITH STATOR AND MOTOR HOUSINGS HAVING AT LEAST TWO SEAL MEMBERS

(71) Applicant: NIDEC CORPORATION, Kyoto (JP)

(72) Inventors: Yuki Ishikawa, Kyoto (JP); Masami Sugino, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 55 days.

(21) Appl. No.: 17/400,114

(22) Filed: Aug. 12, 2021

(65) Prior Publication Data

US 2022/0060078 A1 Feb. 24, 2022

(30) Foreign Application Priority Data

Aug. 24, 2020 (JP) ................................. 2020-140893

(51) Int. Cl.
*H02K 5/10* (2006.01)
*H02K 5/173* (2006.01)
*H02K 9/19* (2006.01)
*H02K 5/20* (2006.01)

(52) U.S. Cl.
CPC .............. *H02K 5/10* (2013.01); *H02K 5/173* (2013.01); *H02K 5/20* (2013.01); *H02K 9/19* (2013.01)

(58) Field of Classification Search
CPC .......... H02K 5/10; H02K 5/163; H02K 5/124; H02K 5/132; H02K 5/136; H02K 5/15; H02K 5/12; H02K 5/1285; H02K 7/04; H02K 7/085; H02K 7/08; H02K 7/083
USPC ................................. 310/88, 87, 90.5, 90, 89
See application file for complete search history.

(56) References Cited

U.S. PATENT DOCUMENTS

| 3,270,225 | A | * | 8/1966 | Alexinas | H02K 1/32 310/53 |
| 4,451,750 | A | * | 5/1984 | Heuer | H02K 5/225 439/271 |
| 4,626,721 | A | * | 12/1986 | Ouchi | F04D 13/0693 174/76 |
| 9,825,503 | B2 | * | 11/2017 | Hyun | H02K 5/203 |
| 9,948,155 | B2 | * | 4/2018 | Moura | B25J 11/0095 |
| 10,312,770 | B2 | * | 6/2019 | Jones | H02K 5/225 |

(Continued)

FOREIGN PATENT DOCUMENTS

| CA | 2938534 | A1 | * | 8/2015 | ............... B63G 8/08 |
| CN | 207339512 | U | | 5/2018 | |

(Continued)

*Primary Examiner* — Maged M Almawri
(74) *Attorney, Agent, or Firm* — Hauptman Ham, LLP (57) ABSTRACT

In a motor, a motor housing includes a motor housing main body having a cylindrical portion and a lid portion holding a first bearing, a cover holding a second bearing, a stator housing forming a radial flow path, first and second seal members, and a positioning portion for radially positioning the motor housing main body and the cover. The stator housing includes a stator housing main body and a flange portion positioned between the motor housing main body and the cover in the axial direction. The first seal member seals a gap in the radial direction between the cylindrical portion and the stator housing main body. The second seal member seals a gap in the axial direction between the motor housing main body and the flange portion. The positioning portion positions the stator housing in the radial direction with respect to the motor housing main body and the cover.

17 Claims, 7 Drawing Sheets

(56) References Cited

U.S. PATENT DOCUMENTS

| | | | |
|---|---|---|---|
| 10,396,618 B2* | 8/2019 | Kawashima | H02K 5/124 |
| 10,404,131 B2* | 9/2019 | Sawada | H02K 9/19 |
| 10,411,546 B2* | 9/2019 | Hamagishi | H02K 5/148 |
| 10,516,316 B2* | 12/2019 | Carrillo | H02K 5/18 |
| 10,541,582 B2* | 1/2020 | Li | F04B 47/06 |
| 10,727,716 B2* | 7/2020 | Jones | H02K 5/10 |
| 2001/0036416 A1* | 11/2001 | Obara | H02K 11/33 417/423.12 |
| 2001/0053042 A1* | 12/2001 | Lee | F16C 33/107 360/99.08 |
| 2002/0050899 A1* | 5/2002 | Hashimoto | H02K 5/08 335/220 |
| 2002/0061149 A1* | 5/2002 | Shingai | H02K 7/085 384/490 |
| 2002/0135247 A1* | 9/2002 | Liao | H02K 5/163 310/90 |
| 2011/0133582 A1* | 6/2011 | Bingler | F04D 13/08 310/71 |
| 2014/0050605 A1* | 2/2014 | Inada | H02K 5/12 417/420 |
| 2015/0069862 A1* | 3/2015 | Bulatow | H02K 5/203 310/43 |
| 2015/0076940 A1* | 3/2015 | Ohashi | H02K 5/203 310/58 |
| 2016/0211719 A1* | 7/2016 | Hidaka | H02K 1/02 |
| 2017/0025145 A1* | 1/2017 | Shiraishi | H02K 5/124 |
| 2017/0025146 A1* | 1/2017 | Yoneda | G11B 19/2009 |
| 2019/0089228 A1* | 3/2019 | Fukuda | H02K 11/33 |
| 2019/0185106 A1* | 6/2019 | Lin | B62M 6/65 |
| 2019/0193552 A1* | 6/2019 | Pydin | B60K 1/00 |
| 2020/0303987 A1* | 9/2020 | Stubner | H02K 15/14 |
| 2020/0373805 A1* | 11/2020 | Wang | H02K 21/22 |

FOREIGN PATENT DOCUMENTS

| | | |
|---|---|---|
| JP | H923614 A | 1/1997 |
| JP | 5135156 B2 | 1/2013 |
| JP | 2018157644 A | 10/2018 |

* cited by examiner

MOTOR WITH STATOR AND MOTOR HOUSINGS HAVING AT LEAST TWO SEAL MEMBERS

CROSS-REFERENCE TO RELATED APPLICATIONS

The present invention claims priority under 35 U.S.C. § 119 to Japanese Patent Application No. 2020-140893 filed on Aug. 24, 2020, the entire content of which is incorporated herein by reference.

FIELD OF THE INVENTION

The present invention relates to a motor and a drive device.

BACKGROUND

A motor that includes a motor housing having a motor housing main body and a stator housing that accommodates a stator in the inside and forms a flow path with the motor housing main body. For example, a motor for an electric vehicle as such a motor is described.

In the motor as described above, for example, a cover fixed to the motor housing main body is provided, and each of the motor housing main body and the cover holds a bearing that rotatably supports a rotor. For this reason, it is necessary to assemble the motor housing main body, the cover, and the stator housing with high axial accuracy. In contrast, it is also necessary to provide a seal member in order to seal a fluid flowing in the flow path formed between the motor housing main body and the stator housing. Due to these, there has been a problem that the number of assembling steps of the motor increases.

SUMMARY

One aspect of a motor of the present invention includes a rotor having a shaft rotatable about a central axis, a stator located radially outside the rotor, a motor housing accommodating the rotor and the stator in the inside, and a first bearing and a second bearing that support the shaft rotatably about the central axis. The motor housing includes a motor housing main body that has a cylindrical portion located radially outside the stator and a lid portion located on a first side in an axial direction of the stator and holding the first bearing, a cover that is located on a second side in the axial direction of the motor housing main body and holds the second bearing, a stator housing that accommodates the stator in the inside and forms a flow path with an inner circumferential surface of the cylindrical portion in a radial direction, a first seal member and a second seal member that seal a gap between the motor housing main body and the stator housing, and a positioning portion for positioning the motor housing main body and the cover in the radial direction. The stator housing includes a tubular stator housing main body that is located between the cylindrical portion and the stator in the radial direction and has the stator fixed to the inside of the stator housing main body, and an annular flange portion that protrudes radially outward from the stator housing main body and is located between the motor housing main body and the cover in the axial direction. The first seal member and the second seal member have an annular or substantially annular shape surrounding the central axis. The first seal member seals a gap in the radial direction between the cylindrical portion and the stator housing main body further on the first side in the axial direction than the flow path. The second seal member seals a gap in the axial direction between the motor housing main body and the flange portion further on the second side in the axial direction than the flow path. The positioning portion positions the stator housing in the radial direction with respect to the motor housing main body and the cover.

One aspect of a drive device of the present invention is a drive device that is mounted on a vehicle and rotates an axle. The drive device includes the motor described above, and a transmission device that is connected to the rotor and transmits rotation of the rotor to the axle.

The above and other elements, features, steps, characteristics and advantages of the present disclosure will become more apparent from the following detailed description of the preferred embodiments with reference to the attached drawings.

DETAILED DESCRIPTION

Figure 1:
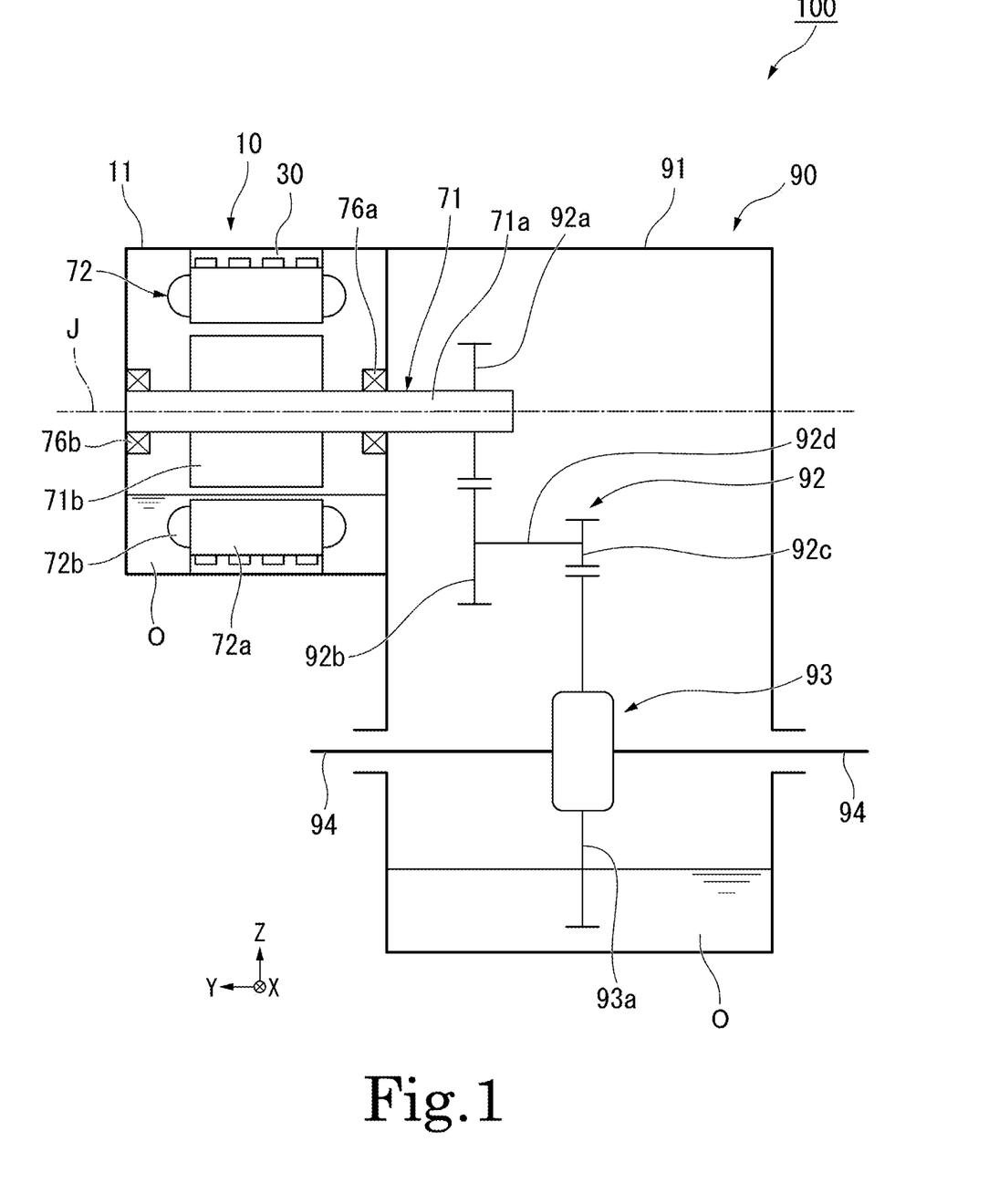
FIG. 1 is a diagram schematically illustrating a drive device according to the present preferred embodiment.

A drive device 100 of the present preferred embodiment shown in FIG. 1 is a drive device that is mounted on a vehicle and rotates an axle 94. The drive device 100 includes a motor 10 and a transmission device 90. The transmission device 90 is connected to a rotor 71 to be described later of the motor 10, and transmits rotation of the rotor 71 to the axle 94. The transmission device 90 of the present preferred embodiment includes a gear housing 91, a speed reduction device 92 connected to the motor 10, and a differential device 93 connected to the speed reduction device 92.

The gear housing 91 accommodates the speed reduction device 92, the differential device 93, and oil O in the inside. The speed reduction device 92 includes a first gear 92a, a second gear 92b, a third gear 92c, and an intermediate shaft 92d. The differential device 93 includes a ring gear 93a.

Figure 2:
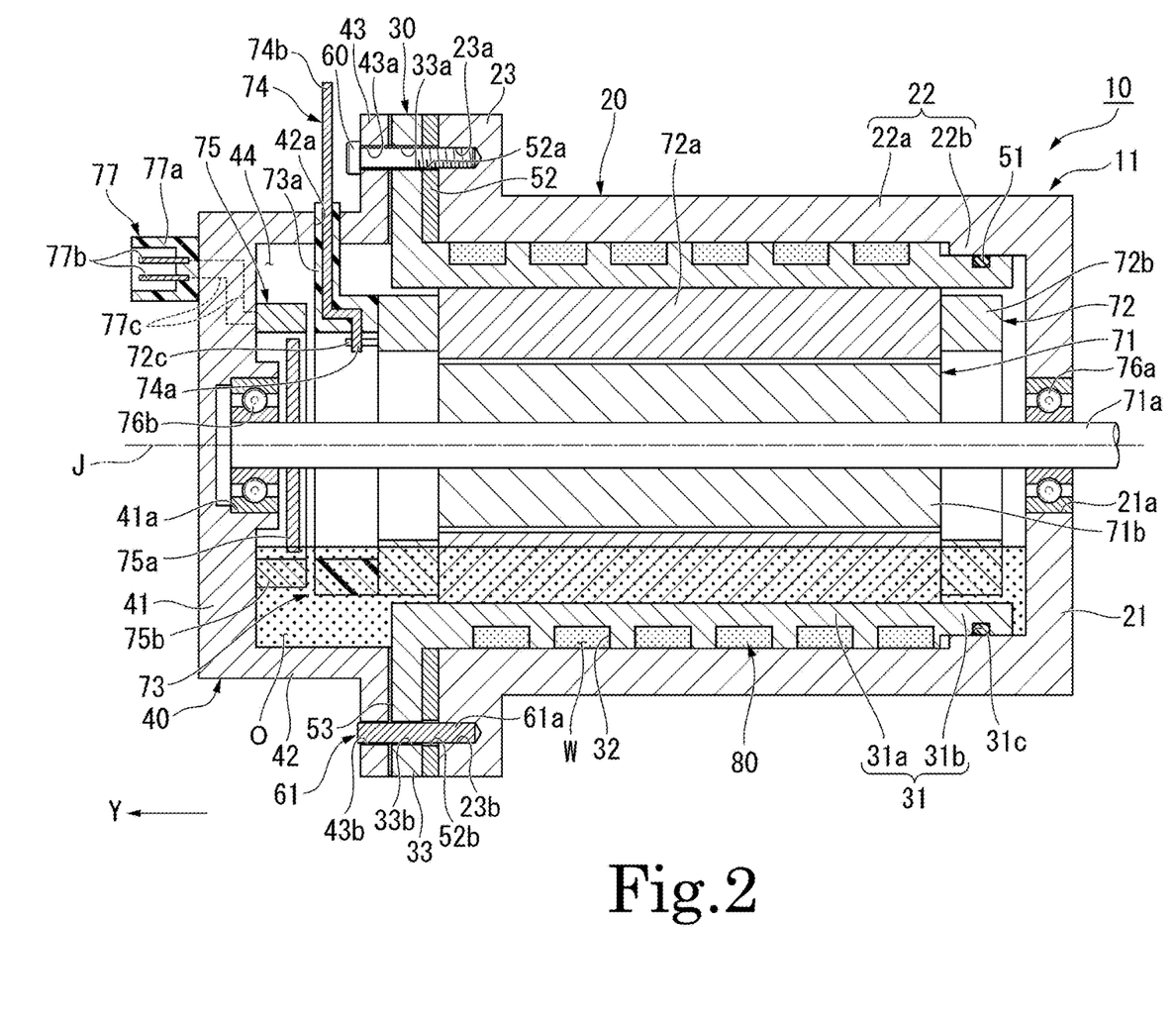
FIG. 2 is a cross-sectional view illustrating a motor of the present preferred embodiment, and is a cross-sectional view taken along line II-II in FIG. 4.

As shown in FIG. 2, the motor 10 includes a rotor 71, a stator 72, a first bearing 76a, a second bearing 76b, a motor housing 11, a bus bar holder 73, a bus bar 74, a rotation detection device 75, and a connector portion 77. The rotor 71 includes a shaft 71a rotatable about a central axis J, and a rotor main body 71b fixed to an outer circumferential surface of the shaft 71a. The rotor main body 71b includes, for example, a rotor core and a magnet.

In the present preferred embodiment, the central axis J extends in the horizontal direction orthogonal to the vertical direction. A direction in which the central axis J extends is, for example, the left-right direction of a vehicle on which the motor 10 is mounted. In description below, unless otherwise particularly stated, a direction parallel to the central axis J is simply referred to as the "axial direction", a radial direction about the central axis J is simply referred to as the "radial direction", and a circumferential direction about the central axis J, that is, a direction around the central axis J is simply referred to as the "circumferential direction". Further, in the drawings, as appropriate, the axial direction is indicated by a Y axis, the side to which an arrow is directed in the Y axis is referred to as the "left side", and the side opposite to the side to which the arrow is directed in the Y axis is referred to as the "right side". In the present preferred embodiment, the right side corresponds to the "first side in the axial direction", and the left side corresponds to the "second side in the axial direction".

Further, in the drawings, as appropriate, the vertical direction orthogonal to the axial direction is indicated by a Z axis, the side to which an arrow is directed in the Z axis is referred to as the "upper side", and the side opposite to the side to which the arrow is directed in the Z axis is referred to as the "lower side". Further, in the drawings, as appropriate, a front-rear direction of the vehicle orthogonal to the axial direction and the vertical direction is indicated by an X axis. Note that the term "parallel direction" also includes a substantially parallel direction, and the term "orthogonal direction" also includes a substantially orthogonal direction.

The stator 72 is located radially outside the rotor 71. The stator 72 includes an annular stator core 72a surrounding the rotor main body 71b and a plurality of coils 72b attached to the stator core 72a. The stator core 72a has, for example, a cylindrical or substantially cylindrical shape about the central axis J. The coil 72b has coil ends protruding from the stator core 72a to both sides in the axial direction. The coil 72b is attached to the stator core 72a with, for example, an insulator (not shown) interposed between them.

The first bearing 76a and the second bearing 76b support the shaft 71a so as to be rotatable about the central axis J. The first bearing 76a rotatably supports a portion of the shaft 71a, the portion being located further on the right side than a portion to which the rotor main body 71b is fixed. The second bearing 76b rotatably supports a portion of the shaft 71a, the portion being located further on the left side than the portion to which the rotor main body 71b is fixed. The second bearing 76b rotatably supports, for example, an end portion on the left side of the shaft 71a. The first bearing 76a and the second bearing 76b are, for example, ball bearings.

The motor housing 11 accommodates the rotor 71 and the stator 72 in the inside. For example, the oil O is accommodated in the motor housing 11. The oil O in the motor housing 11 is used, for example, for lubricating the first bearing 76a and the second bearing 76b, for cooling the stator 72, and the like. In the motor housing 11, the oil surface of the oil O is located, for example, below the rotor 71.

The motor housing 11 includes a motor housing main body 20, a stator housing 30, a cover 40, a first seal member 51, a second seal member 52, a third seal member 53, and a positioning portion 61. The motor housing main body 20, the stator housing 30, and the cover 40 are, for example, single members different from each other. The motor housing main body 20, the stator housing 30, and the cover 40 are formed by, for example, die casting.

The motor housing main body 20 includes a lid portion 21, a cylindrical portion 22, and a main body flange portion 23. The lid portion 21 is located on the right side of the stator 72. Although not shown, the lid portion 21 has, for example, a circular or substantially circular shape about the central axis J when viewed in the axial direction. The lid portion 21 has, in a center portion in the radial direction, a hole portion 21a penetrating the lid portion 21 in the axial direction. The first bearing 76a is fitted into the hole portion 21a. In this manner, the lid portion 21 holds the first bearing 76a. The shaft 71a passes through the hole portion 21a.

The cylindrical portion 22 is located radially outside the stator 72. The cylindrical portion 22 extends to the left side from, for example, a radially outer circumferential edge portion of the lid portion 21. The cylindrical portion 22 has a cylindrical or substantially cylindrical shape about the central axis J. The cylindrical portion 22 opens to the left side. In the present preferred embodiment, the cylindrical portion 22 includes a flow path constituting portion 22a and a sealed portion 22b. The flow path constituting portion 22a and the sealed portion 22b have, for example, a cylindrical or substantially cylindrical shape surrounding the central axis J. The flow path constituting portion 22a is a portion constituting a flow path 80 in the radial direction with an outer circumferential surface of a stator housing main body 31 described later. An end portion on the left side of the flow path constituting portion 22a is, for example, an end portion on the left side of the cylindrical portion 22.

The sealed portion 22b is connected to the right side of the flow path constituting portion 22a. An end portion on the right side of the sealed portion 22b is, for example, an end portion on the right side of the cylindrical portion 22, and is connected to the lid portion 21. The sealed portion 22b is a portion where space in the radial direction formed with the stator housing main body 31 described later is sealed by the first seal member 51. An inner circumferential surface of the sealed portion 22b protrudes radially inward further than an inner circumferential surface of the flow path constituting portion 22a. In other words, an inner diameter of the sealed portion 22b is smaller than an inner diameter of the flow path constituting portion 22a. An outer circumferential surface of the sealed portion 22b is located at the same position in the radial direction as an outer circumferential surface of the flow path constituting portion 22a, for example. A dimension in the axial direction of the sealed portion 22b is, for example, smaller than a dimension in the axial direction of the flow path constituting portion 22a.

Figure 3:
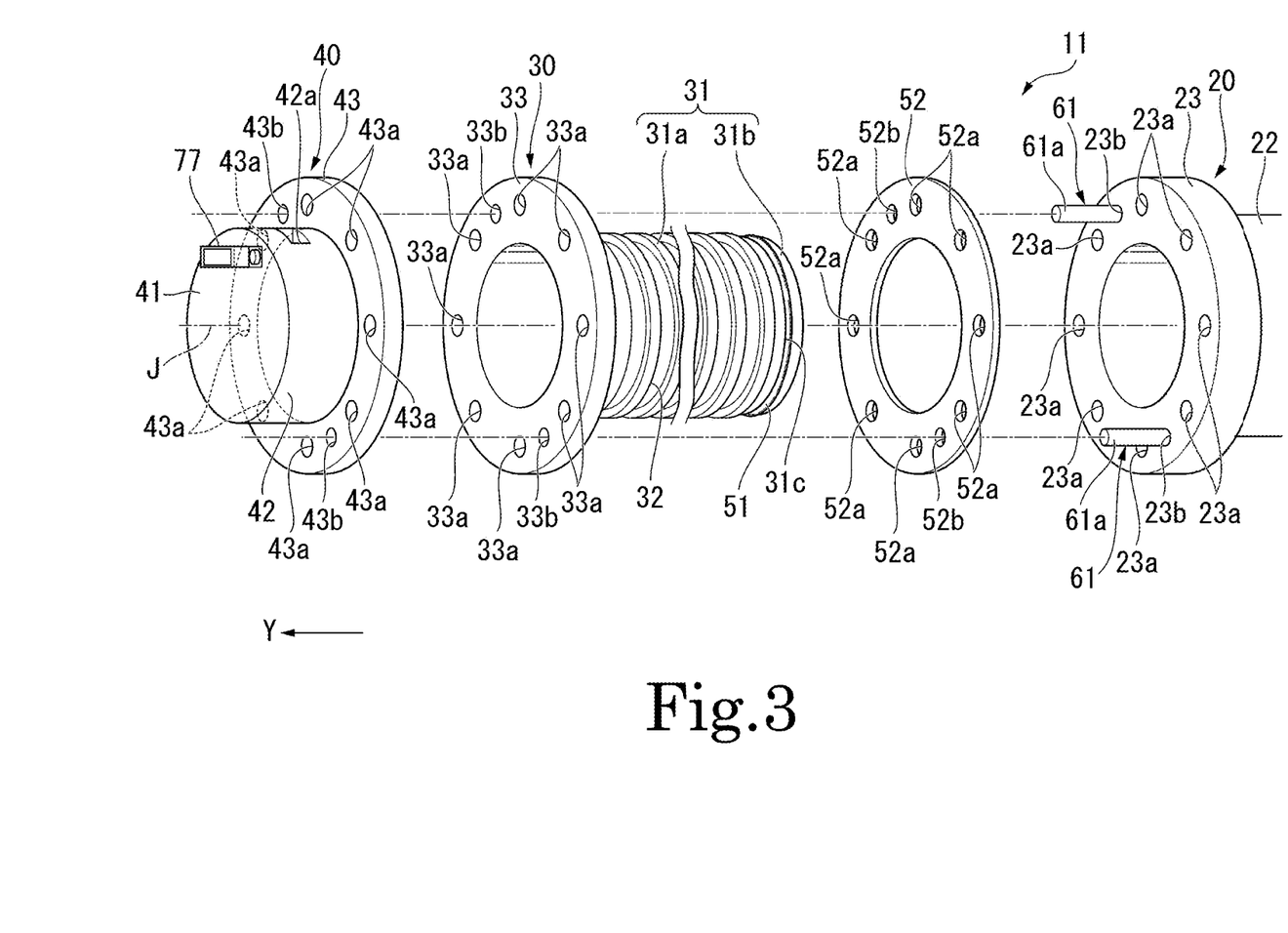
FIG. 3 is an exploded perspective view illustrating a motor housing of the present preferred embodiment.

The main body flange portion 23 protrudes radially outward from an end portion on the left side of the cylindrical portion 22. As shown in FIG. 3, the main body flange portion 23 has, for example, an annular or substantially annular shape about the central axis J. The main body flange portion 23 has a female screw hole 23a and a hole portion 23b. The female screw hole 23a and the hole portion 23b are, for example, circular holes having a bottom portion on the right side and opening on the left side. A plurality of the female screw holes 23a are provided at intervals in the circumferential direction. For example, a plurality of the female screw holes 23a are arranged at equal intervals over the entire circumference along the circumferential direction. For example, eight of the female screw holes 23a are provided.

In the present preferred embodiment, two of the hole portions 23b are provided. For example, the two hole portions 23b are disposed on opposite sides to each other by sandwiching the central axis J in the radial direction. Each of the two hole portions 23b is disposed between the female screw holes 23a adjacent to each other in the circumferential direction. An inner diameter of the hole portion 23b is smaller than an inner diameter of the female screw hole 23a, for example.

As shown in FIG. 2, the stator housing 30 accommodates the stator 72 in the inside. The stator housing 30 is a member constituting the flow path 80 in the radial direction with an inner circumferential surface of the cylindrical portion 22. The stator housing 30 includes the stator housing main body 31 and a flange portion 33.

The stator housing main body 31 has a tubular or substantially tubular shape in which the stator 72 is fixed. The stator core 72a is fixed inside the stator housing main body 31 by shrink fitting, for example. The stator housing main body 31 has, for example, a cylindrical or substantially cylindrical shape around the central axis J with openings on both sides in the axial direction. The stator housing main body 31 is located between the cylindrical portion 22 and the stator 72 in the radial direction. The stator housing main body 31 is fitted in the cylindrical portion 22. An outer circumferential surface of the stator housing main body 31 is in contact with, for example, an inner circumferential surface of the cylindrical portion 22. An outer circumferential surface of the stator core 72a is in contact with an inner circumferential surface of the stator housing main body 31.

The stator housing main body 31 includes a flow path constituting portion 31a and a sealed portion 31b. The flow path constituting portion 31a and the sealed portion 31b have, for example, a cylindrical or substantially cylindrical shape surrounding the central axis J. The flow path constituting portion 31a is a portion constituting the flow path 80 in the radial direction with an inner circumferential surface of the flow path constituting portion 22a of the cylindrical portion 22. An end portion on the left side of the flow path constituting portion 31a is, for example, an end portion on the left side of the stator housing main body 31. The flow path constituting portion 31a is fitted into the flow path constituting portion 22a.

The flow path constituting portion 31a has a groove 32 recessed radially inward from an outer circumferential surface. As shown in FIG. 3, the groove 32 has, for example, a spiral or substantially spiral shape surrounding the flow path constituting portion 31a. As shown in FIG. 2, an opening on the radially outer side of the groove 32 is blocked by an inner circumferential surface of the flow path constituting portion 22a. In this manner, the flow path 80 is formed between the flow path constituting portion 22a and the flow path constituting portion 31a in the radial direction.

The inside of the flow path 80 is, for example, the inside of the groove 32. The flow path 80 has, for example, a spiral or substantially spiral shape surrounding the stator 72. A fluid flowing through the flow path 80 is, for example, water W. Note that the fluid flowing through the flow path 80 is not particularly limited, and may be oil. The water W flows into the flow path 80 from the outside of the motor 10. The water W flowing into the flow path 80 spirally flows on the radially outside of the stator 72 along the flow path 80 and is discharged to the outside of the motor 10. The stator 72 is cooled by the water W passing through the flow path 80.

The sealed portion 31b is connected to the right side of the flow path constituting portion 31a. The sealed portion 31b is fitted into the sealed portion 22b. An end portion on the right side of the sealed portion 31b is, for example, an end portion on the right side of the stator housing main body 31. An end portion on the right side of the sealed portion 31b is disposed away from the lid portion 21 to the left. The sealed portion 31b is a portion where a gap in the radial direction formed with the sealed portion 22b of the cylindrical portion 22 is sealed by the first seal member 51. An outer circumferential surface of the sealed portion 31b is recessed radially inward further than an outer circumferential surface of the flow path constituting portion 31a. In other words, an outer diameter of the sealed portion 31b is smaller than an outer diameter of the flow path constituting portion 31a. An inner circumferential surface of the sealed portion 31b is located at the same position in the radial direction as an inner circumferential surface of the flow path constituting portion 31a, for example. A dimension in the axial direction of the sealed portion 31b is, for example, smaller than a dimension in the axial direction of the flow path constituting portion 31a. The sealed portion 31b has a seal groove 31c into which the first seal member 51 is fitted. The seal groove 31c has, for example, an annular or substantially annular shape about the central axis J.

The flange portion 33 protrudes radially outward from the stator housing main body 31. In the present preferred embodiment, the flange portion 33 protrudes radially outward from an end portion on the left side of the stator housing main body 31. The flange portion 33 has an annular or substantially annular shape positioned between the motor housing main body 20 and the cover 40 in the axial direction. In the present preferred embodiment, the flange portion 33 is positioned between the main body flange portion 23 and a cover flange portion 43, which will be described later, of the cover 40 in the axial direction. As shown in FIG. 3, the flange portion 33 has, for example, an annular or substantially annular shape about the central axis J.

The flange portion 33 has a fixing hole 33a and a through hole 33b. The fixing hole 33a and the through hole 33b are circular holes penetrating the flange portion 33 in the axial direction. A plurality of the fixing holes 33a are provided at intervals in the circumferential direction. For example, a plurality of the fixing holes 33a are arranged at equal intervals over the entire circumference along the circumferential direction. For example, eight of the fixing holes 33a are provided.

In the present preferred embodiment, two of the through holes 33b are provided. For example, the two through holes 33b are disposed on opposite sides to each other by sandwiching the central axis J in the radial direction. Each of the two through holes 33b is disposed between the fixing holes 33a adjacent to each other in the circumferential direction. An inner diameter of the through hole 33b is smaller than an inner diameter of the fixing hole 33a, for example.

The cover 40 is located on the left side of the motor housing main body 20. The cover 40 includes a top wall portion 41, a circumferential wall portion 42, and the cover flange portion 43. As shown in FIG. 2, the top wall portion 41 is located on the left side of the rotor 71 and the stator 72. The top wall portion 41 covers the entire rotor 71 and the entire stator 72 from the left side. In this manner, in the present preferred embodiment, the cover 40 covers the entire rotor 71 from the left side. For this reason, with the cover 40, it is easy to prevent a foreign matter from entering the motor housing 11.

As shown in FIG. 3, the top wall portion 41 has, for example, a circular or substantially circular shape about the central axis J when viewed in the axial direction. As shown in FIG. 2, the top wall portion 41 has a holding recess 41a recessed to the left side from a surface on the right side of the top wall portion 41. The second bearing 76b is fitted into the holding recess 41a. In this manner, the cover 40 holds the second bearing 76b.

The circumferential wall portion 42 has, for example, a cylindrical or substantially cylindrical shape extending to the right side from a radially outer circumferential edge portion of the top wall portion 41. The circumferential wall portion 42 has a bus bar through hole 42a penetrating the circumferential wall portion 42 in the radial direction. That is, the cover 40 has the bus bar through hole 42a. The bus bar 74 passes through the bus bar through hole 42a. The bus bar through hole 42a penetrates, for example, a portion located on the upper side of the circumferential wall portion 42 in the vertical direction.

The cover flange portion 43 protrudes radially outward from an end portion on the right side of the circumferential wall portion 42. As shown in FIG. 3, the cover flange portion 43 has, for example, an annular or substantially annular shape about the central axis J. The cover flange portion 43 has a fixing hole 43a and a hole portion 43b. In the present preferred embodiment, the fixing hole 43a and the hole portion 43b are circular holes penetrating the cover flange portion 43 in the axial direction. A plurality of the fixing holes 43a are provided at intervals in the circumferential direction. For example, a plurality of the fixing holes 43a are arranged at equal intervals over the entire circumference along the circumferential direction. For example, eight of the fixing holes 43a are provided.

In the present preferred embodiment, two of the hole portions 43b are provided. For example, the two hole portions 43b are disposed on opposite sides to each other by sandwiching the central axis J in the radial direction. Each of the two hole portions 43b is disposed between the fixing holes 43a adjacent to each other in the circumferential direction. An inner diameter of the hole portion 43b is smaller than an inner diameter of the fixing hole 43a, for example.

As shown in FIG. 2, in the present preferred embodiment, the cover 40 has an accommodating portion 44 that accommodates the rotation detection device 75. The accommodating portion 44 includes the top wall portion 41 and the circumferential wall portion 42. The inside of the accommodating portion 44 is located on the left side of the inside of the stator housing 30 and is connected to the inside of the stator housing 30. The accommodating portion 44 has, for example, a tubular shape protruding to the left side. The accommodating portion 44 has, for example, a dome or substantially dome shape that bulges to the left side.

The first seal member 51 and the second seal member 52 are members that seal a gap between the motor housing main body 20 and the stator housing 30. As shown in FIG. 3, the first seal member 51 and the second seal member 52 have an annular or substantially annular shape surrounding the central axis J. The first seal member 51 and the second seal member 52 have, for example, an annular or substantially annular shape about the central axis J. The first seal member 51 and the second seal member 52 surround the stator housing main body 31.

The first seal member 51 is, for example, an O-ring fitted into the seal groove 31c. For example, the first seal member 51 is in contact with a groove bottom surface of the seal groove 31c and an inner circumferential surface of the sealed portion 22b, and is in a state of being compressed and elastically deformed in the radial direction. The first seal member 51 seals a gap between the cylindrical portion 22 and the stator housing main body 31 in the radial direction on the right side of the flow path 80. In the present preferred embodiment, the first seal member 51 seals a gap in the radial direction between an inner circumferential surface of the sealed portion 22b and an outer circumferential surface of the sealed portion 31b.

As shown in FIG. 3, the second seal member 52 has, for example, a plate or substantially plate shape whose plate surface faces the axial direction. As shown in FIG. 2, a surface on the right side of the second seal member 52 is in contact with a surface on the left side of the main body flange portion 23. A surface on the left side of the second seal member 52 is in contact with a surface on the right side of the flange portion 33. The second seal member 52 seals a gap in the axial direction between the motor housing main body 20 and the flange portion 33 on the left side of the flow path 80. In the present preferred embodiment, the second seal member 52 is made from metal. In the present preferred embodiment, the second seal member 52 is a member obtained by coating an electrogalvanized steel plate as a main material with a compound. Metal constituting the second seal member 52 may be, for example, titanium, aluminum, copper, iron, or the like.

The second seal member 52 has a fixing hole 52a and a through hole 52b. As shown in FIG. 3, the fixing hole 52a and the through hole 52b are circular holes penetrating the second seal member 52 in the axial direction. A plurality of the fixing holes 52a are provided at intervals in the circumferential direction. For example, a plurality of the fixing holes 52a are arranged at equal intervals over the entire circumference along the circumferential direction. For example, eight of the fixing holes 52a are provided.

In the present preferred embodiment, two of the through holes 52b are provided. For example, the two through holes 52b are disposed on opposite sides to each other by sandwiching the central axis J in the radial direction. Each of the two through holes 52b is disposed between the fixing holes 52a adjacent to each other in the circumferential direction. An inner diameter of the through hole 52b is smaller than an inner diameter of the fixing hole 52a, for example.

The female screw hole 23a of the motor housing main body 20, the fixing hole 33a of the stator housing 30, the fixing hole 43a of the cover 40, and the fixing hole 52a of the second seal member 52 overlap each other when viewed in the axial direction. An inner diameter of the fixing holes 33a, 43a, and 52a is larger than an inner diameter of the female screw hole 23a.

Figure 4:
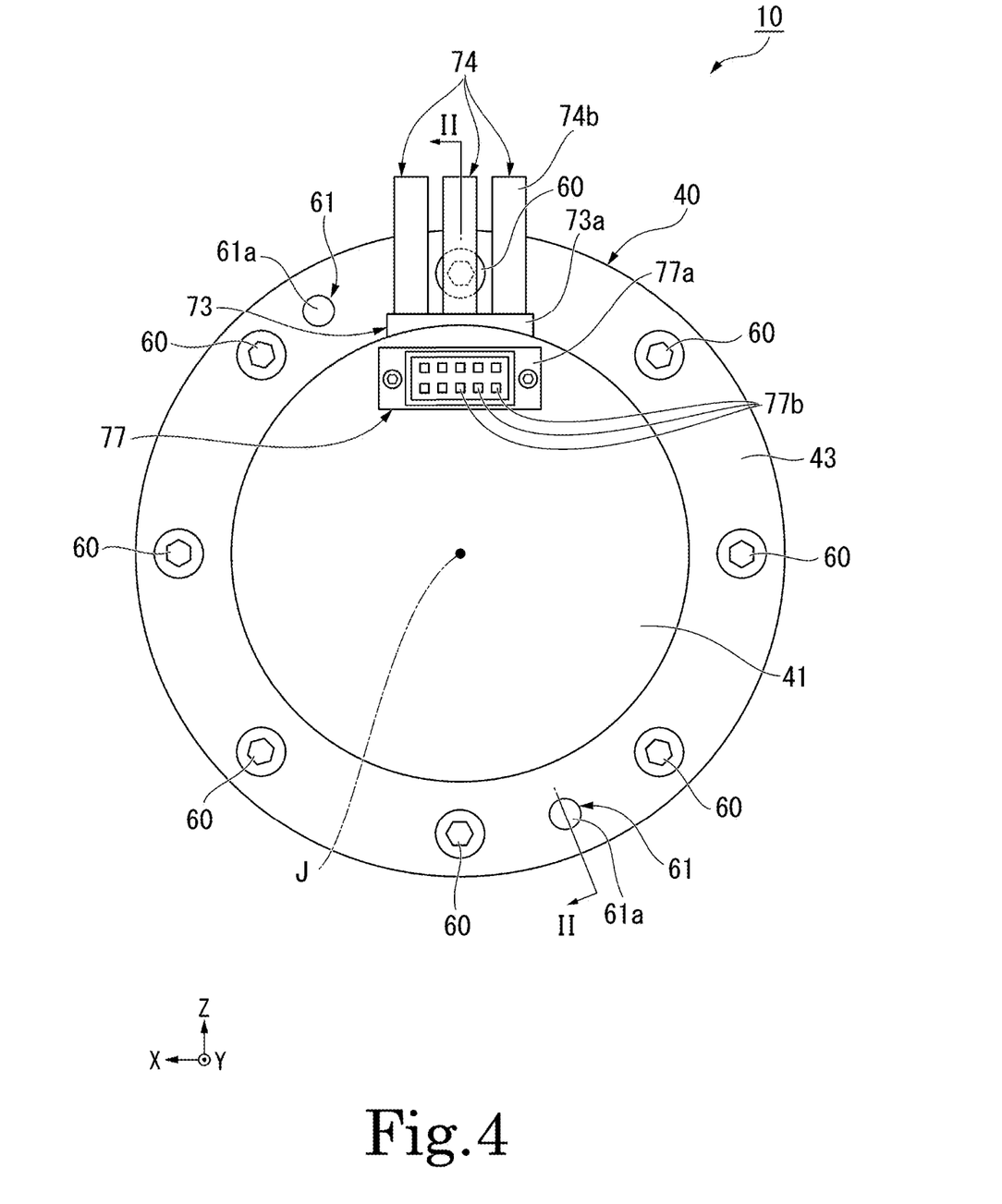
FIG. 4 is a diagram of the motor according to the present preferred embodiment as viewed from the left side.

As shown in FIG. 2, in the present preferred embodiment, the motor housing main body 20 and the cover 40 are fixed to each other by a screw member 60 axially penetrating the fixing hole 33a provided on the flange portion 33 and the fixing hole 52a provided on the second seal member 52. The screw member 60 passes through the fixing hole 43a, the fixing hole 33a, and the fixing hole 52a from the left side of the cover flange portion 43, and is tightened into the female screw hole 23a. In this manner, in the present preferred embodiment, the motor housing main body 20, the stator housing 30, the cover 40, and the second seal member 52 are fastened together by the screw member 60. As shown in FIG. 4, for example, eight of the screw members 60 are provided.

Figure 5:
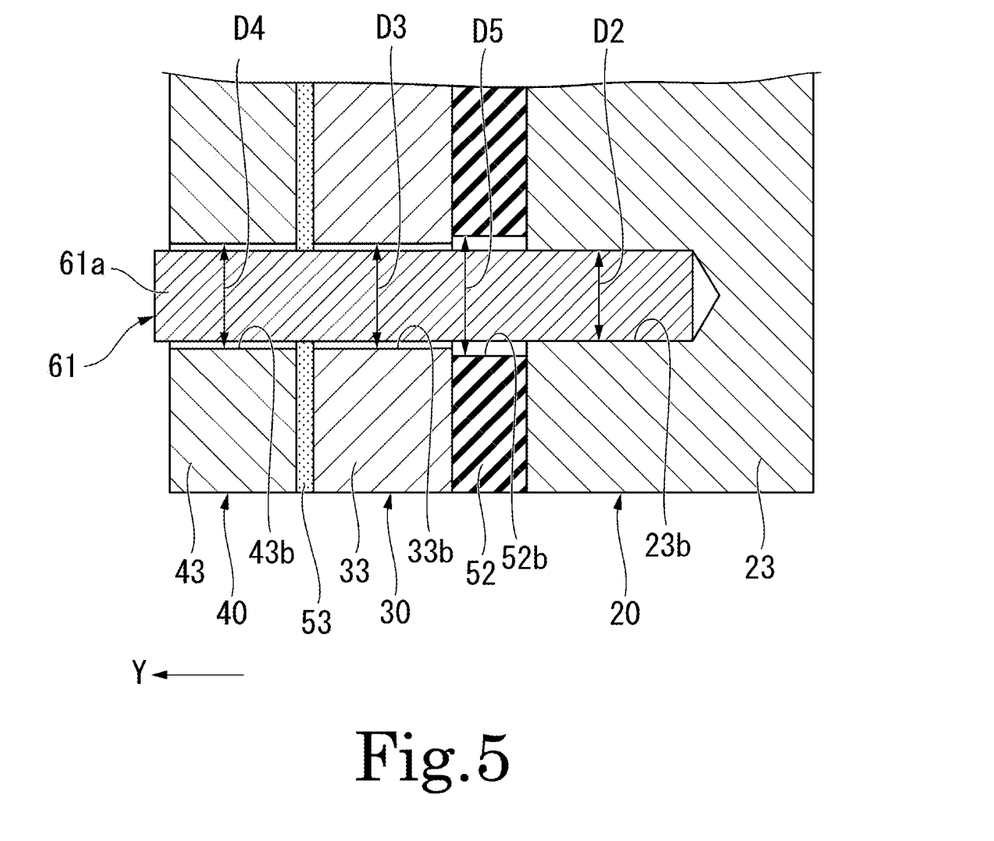
FIG. 5 is a cross-sectional view illustrating a positioning portion of the present preferred embodiment.

The hole portion 23b of the motor housing main body 20, the through hole 33b of the stator housing 30, the hole portion 43b of the cover 40, and the through hole 52b of the second seal member 52 overlap each other when viewed in the axial direction. As shown in FIG. 5, an inner diameter D2 of the hole portion 23b provided on the motor housing main body 20 and an inner diameter D4 of the hole portion 43b provided on the cover 40 are different from each other. In the present preferred embodiment, the inner diameter D2 of the hole portion 23b is smaller than the inner diameter D4 of the hole portion 43b. For example, in each of a pair of the hole portions 23b and 43b and a pair of the through holes 33b and 52b, one is disposed at a position shifted in the circumferential direction with respect to a position obtained by rotating the other by 180° in the circumferential direction.

At least one of the inner diameter D2 of the hole portion 23b provided on the motor housing main body 20 and the inner diameter D4 of the hole portion 43b provided in the cover 40 is smaller than an inner diameter D3 of the through hole 33b provided on the flange portion 33. In the present preferred embodiment, the inner diameter D2 of the hole portion 23b is smaller than the inner diameter D3 of the through hole 33b. The inner diameter D4 of the hole portion 43b is, for example, the same as the inner diameter D3 of the through hole 33b. In the present preferred embodiment, the inner diameter D2 of the hole portion 23b provided on the motor housing main body 20, the inner diameter D3 of the through hole 33b provided on the stator housing 30, and the inner diameter D4 of the hole portion 43b provided on the cover 40 are smaller than an inner diameter D5 of the through hole 52b provided on the second seal member 52.

In the present preferred embodiment, an end surface on the left side of the motor housing main body 20 and an end surface on the right side of the second seal member 52 and the flange portion 33 entirely overlap each other when viewed in the axial direction. That is, the end surface on the left side of the motor housing main body 20 and the end surface on the right side of the second seal member 52 and the flange portion 33 have the same shape and the same size when viewed in the axial direction. In the present preferred embodiment, the end surface on the left side of the motor housing main body 20 is an end surface on the left side of the main body flange portion 23.

The third seal member 53 seals a gap in the axial direction between the flange portion 33 and the cover 40. In this manner, the third seal member 53 can prevent a foreign matter from entering the inside of the motor housing 11 from between the flange portion 33 and the cover 40. Further, it is possible to prevent the oil O in the motor housing 11 from leaking to the outside. In the present preferred embodiment, the third seal member 53 is positioned in a gap in the axial direction between the flange portion 33 and the cover flange portion 43. The third seal member 53 is configured, for example, by curing a liquid gasket.

The positioning portion 61 is a portion for radially positioning the motor housing main body 20 and the cover 40. In the present preferred embodiment, the positioning portion 61 has a pin portion 61a extending from the motor housing main body 20 to the cover 40. In the present preferred embodiment, the positioning portion 61 includes only the pin portion 61a. The pin portion 61a is, for example, a columnar member extending in the axial direction. In the present preferred embodiment, the pin portion 61a is fitted into the hole portion 23b provided on the motor housing main body 20 and the hole portion 43b provided on the cover 40. In this manner, in the present preferred embodiment, the positioning portion 61 positions the motor housing main body 20 and the cover 40 in the radial direction and the circumferential direction.

For example, the pin portion 61a is press-fitted into the hole portion 23b of the motor housing main body 20 and fixed to the motor housing main body 20. The pin portion 61a is, for example, fitted with clearance into the hole portion 43b of the cover 40. The pin portion 61a extends from the motor housing main body 20 to the cover 40 through the through hole 52b of the second seal member 52 and the through hole 33b of the stator housing 30. That is, in the present preferred embodiment, the pin portion 61a passes through the through holes 33b and 52b in the axial direction and penetrates the flange portion 33 and the second seal member 52 in the axial direction.

The pin portion 61a is, for example, fitted with clearance into the through hole 33b of the stator housing 30. In this manner, the positioning portion 61 positions the stator housing 30 with respect to the motor housing main body 20 and the cover 40 in the radial direction and the circumferential direction. Further, since the pin portion 61a passes through the through hole 52b of the second seal member 52, the pin portion 61a prevents the second seal member 52 from moving in the circumferential direction. In this manner, in the present preferred embodiment, the positioning portion 61 positions the second seal member 52 with respect to the motor housing main body 20 and the cover 40 in the radial direction and the circumferential direction.

As shown in FIG. 4, in the present preferred embodiment, a pair of the positioning portions 61 are provided in a manner sandwiching the central axis J in the radial direction. That is, in the present preferred embodiment, a pair of the pin portions 61a are provided in a manner sandwiching the central axis J in the radial direction. Each of the positioning portions 61 is located between the screw members 60 adjacent to each other in the circumferential direction.

One of the positioning portions 61 is disposed at a position shifted in the circumferential direction with respect to a position obtained by rotating the other one of the positioning portions 61 by 180° in the circumferential direction. For this reason, members positioned by the positioning portion 61 cannot be assembled in a state of being rotated by 180° in the circumferential direction. In this manner, when each member is assembled while being positioned by the positioning portion 61, it is possible to prevent each member from being assembled in an incorrect direction.

As shown in FIG. 2, the bus bar holder 73 is a resin member that holds the bus bar 74. The bus bar holder 73 is attached to the left side of the stator 72, for example. The bus bar holder 73 is accommodated in the accommodating portion 44, for example. The bus bar holder 73 has an extending portion 73a extending upward and fitted into the bus bar through hole 42a.

The bus bar 74 is electrically connected to the stator 72 inside the motor housing 11. The bus bar 74 includes a coil connection portion 74a and a terminal portion 74b. The coil connecting portion 74a is electrically connected to a lead wire 72c drawn out from the coil 72b inside the motor housing 11. The terminal portion 74b passes through the bus bar through hole 42a and protrudes to the outside of the motor housing 11. A lower portion of the terminal portion 74b is held by the extending portion 73a. A portion of the terminal portion 74b, the portion protruding to the outside of the motor housing 11, is electrically connected to, for example, an inverter (not shown). As shown in FIG. 4, for example, a plurality of the bus bars 74 are provided. For example, three of the bus bars 74 are provided.

The rotation detection device 75 shown in FIG. 2 can detect the rotation of the rotor 71. For example, the rotation detection device 75 is located on the left side of the bus bar holder 73 inside the accommodating portion 44. The rotation detection device 75 is, for example, a resolver. The rotation detection device 75 includes a resolver rotor 75a and a resolver stator 75b. The resolver rotor 75a is fixed to an outer circumferential surface of the shaft 71a. The resolver stator 75b is located radially outside the resolver rotor 75a. The resolver stator 75b has an annular or substantially annular shape surrounding the resolver rotor 75a. For example, the resolver stator 75b is fixed to a surface on the right side of the top wall portion 41.

Although not shown, the resolver stator 75b includes a coil. When the resolver rotor 75a rotates together with the shaft 71a, an induced voltage corresponding to a circumferential position of the resolver rotor 75a is generated in the coil of the resolver stator 75b. The rotation detection device 75 can detect the rotation of the resolver rotor 75a and the shaft 71a based on a change in the induced voltage generated in the coil of the resolver stator 75*b*. In this manner, the rotation detection device 75 can detect the rotation of the rotor 71.

The connector portion 77 is fixed to the cover 40 outside the motor housing 11. For example, the connector portion 77 is fixed with a screw to a surface on the left side of the top wall portion 41 of the cover 40. The connector portion 77 includes a connector case 77*a* and a plurality of terminals 77*b* held by the connector case 77*a*. The terminal 77*b* is electrically connected to the resolver stator 75*b* by a wiring 77*c*. In this manner, the connector portion 77 is electrically connected to the rotation detection device 75. The wiring 77*c* passes through, for example, the top wall portion 41.

In the present preferred embodiment, a worker or the like who assembles the motor 10 press-fits and fixes the pin portions 61*a* to the hole portions 23*b* of the motor housing main body 20. Note that, in the present description, the term "worker or the like" includes a worker who performs each work, an assembling device, and the like. Each work may be performed only by a worker, may be performed only by an assembling device, or may be performed by a worker and an assembling device.

Next, the worker or the like brings the second seal member 52 close to the motor housing main body 20 from the left side, and passes the pin portions 61*a* through the through holes 52*b* of the second seal member 52. Next, the worker or the like brings the stator housing 30, to which the stator 72 and the first seal member 51 are attached, close to the motor housing main body 20 from the left side, and fits the stator housing main body 31 into the cylindrical portion 22 while allowing the stator housing main body 31 to pass through the inside of the second seal member 52. At this time, the worker or the like passes the pin portions 61*a* through the through holes 33*b* of the flange portion 33. As the stator housing main body 31 is fitted into the cylindrical portion 22, a gap in the radial direction between the cylindrical portion 22 and the stator housing main body 31 is sealed by the first seal member 51 attached to an outer circumferential surface of the stator housing main body 31.

Note that, as shown in FIG. 3, before the stator housing main body 31 is fitted to the cylindrical portion 22, the first seal member 51 fitted in the seal groove 31*c* protrudes radially outward further than an outer circumferential surface of the sealed portion 31*b* and is located radially inward further than an outer circumferential surface of the flow path constituting portion 31*a*, for example.

Next, the worker or the like attaches a bus bar assembly including the bus bar holder 73 and the bus bar 74 to the stator 72. Note that the work of attaching the bus bar holder 73 and the bus bar 74 may be performed before the stator housing 30 is assembled with the motor housing main body 20.

Next, the worker or the like brings the cover 40 in a state in which the second bearing 76*b*, the rotor 71, the rotation detection device 75, and the connector portion 77 are assembled close to the stator housing 30 from the left side, and passes the pin portions 61*a* through the hole portions 43*b* of the cover 40. At this time, a liquid gasket before being cured to become the third seal member 53 is applied to an end surface on the right side of the cover flange portion 43 or an end surface on the left side of the flange portion 33. Note that the connector portion 77 may be attached to the cover 40 after the cover 40 is assembled.

Next, the worker or the like inserts the screw member 60 into the hole portion 43*b* from the left side of the cover flange portion 43, and tightens the screw member 60 into the female screw hole 23*a* of the motor housing main body 20 via the fixing holes 33*a* and 52*a*. In this manner, the motor housing main body 20, the stator housing 30, the cover 40, and the second seal member 52 are fastened together. As described above, the motor housing main body 20, the stator housing 30, the cover 40, and the second seal member 52 are fixed to each other, and the motor 10 is assembled.

According to the present preferred embodiment, the stator housing 30 can be positioned in the radial direction with respect to the motor housing main body 20 and the cover 40 by the positioning portion 61 for radially positioning the motor housing main body 20 and the cover 40. For this reason, it is not necessary to separately provide a portion for radially positioning the stator housing 30 in addition to the positioning portion 61. In this manner, the motor housing main body 20, the stator housing 30, and the cover 40 can be positioned in the radial direction while the number of assembling steps of the motor 10 is reduced. Since the motor housing main body 20 and the cover 40 can be positioned in the radial direction, the first bearing 76*a* held by the motor housing main body 20 and the second bearing 76*b* held by the cover 40 can be arranged with high axial accuracy. For this reason, the shaft 71*a* rotatably supported by the first bearing 76*a* and the second bearing 76*b* can be arranged with high axial accuracy. Further, since the stator housing 30 can be positioned in the radial direction with respect to the motor housing main body 20 and the cover 40, the stator 72 fixed to the stator housing 30 can be arranged with high axial accuracy with respect to the rotor 71.

Further, according to the present preferred embodiment, the annular first seal member 51 and second seal member 52 surrounding the central axis J are provided. The first seal member 51 seals a gap in the radial direction between the cylindrical portion 22 and the stator housing main body 31 further on the right side than the flow path 80, and the second seal member 52 seals a gap in the axial direction between the motor housing main body 20 and the flange portion 33 further on the left side than the flow path 80. For this reason, as described above, by inserting the stator housing main body 31 into the motor housing main body 20 and assembling the stator housing 30 with the motor housing main body 20, it is possible to seal a gap between the motor housing main body 20 and the stator housing 30 on both side in the axial direction of the flow path 80 with the first seal member 51 and the second seal member 52. In this manner, it is possible to prevent the water W in the flow path 80 from leaking to the inside of the motor housing 11 and the outside of the motor housing 11. Further, the oil O in the motor housing 11 can be prevented from entering the flow path 80 by the first seal member 51.

Further, since the first seal member 51 is a member that elastically deforms as in the present preferred embodiment, the stator housing 30 can be arranged with high axial accuracy with respect to the motor housing main body 20 by using an elastic force generated in the first seal member 51. Specifically, when the first seal member 51 is compressed and elastically deformed in the radial direction, the stator housing main body 31 receives an elastic force inward in the radial direction from the annular first seal member 51 over the entire circumference. In this manner, the radial center of the stator housing main body 31 is passively aligned with the radial center of the cylindrical portion 22. Therefore, by assembling the stator housing 30 with the motor housing main body 20 and sealing a gap in the radial direction between the cylindrical portion 22 and the stator housing main body 31 with the first seal member 51, the stator housing 30 can also be positioned in the radial direction with respect to the motor housing main body 20 by the first seal member 51. For this reason, a gap between the motor housing main body 20 and the stator housing 30 can be sealed, and the stator housing 30 can be arranged with higher axial accuracy with respect to the motor housing main body 20.

As described above, according to the present preferred embodiment, the stator housing 30 is positioned and assembled with respect to the motor housing main body 20, and a gap between the stator housing 30 and the motor housing main body 20 can be sealed by the first seal member 51 and the second seal member 52. Therefore, the number of assembling steps of the motor 10 can be further reduced.

Further, according to the present preferred embodiment, the positioning portion 61 positions the second seal member 52 with respect to the motor housing main body 20 and the cover 40. For this reason, it is not necessary to separately provide a portion for positioning the second seal member 52 in addition to the positioning portion 61. In this manner, it is possible to further reduce the number of assembling steps of the motor 10 and to suppress displacement of the position of the second seal member 52. In this manner, a gap in the axial direction between the motor housing main body 20 and the flange portion 33 can be suitably sealed by the second seal member 52.

Further, according to the present preferred embodiment, the positioning portion 61 has the pin portion 61a that penetrates the flange portion 33 of the stator housing 30 and the second seal member 52 in the axial direction and extends from the motor housing main body 20 to the cover 40. For this reason, the pin portion 61a can be hooked in the circumferential direction on the flange portion 33 and the second seal member 52. In this manner, the stator housing 30 and the second seal member 52 can be positioned in the circumferential direction with respect to the motor housing main body 20 and the cover 40 by the pin portion 61a.

Further, according to the present preferred embodiment, the motor housing main body 20 and the cover 40 are fixed to each other by the screw member 60 axially penetrating the fixing hole 33a provided on the flange portion 33 and the fixing hole 52a provided on the second seal member 52. For this reason, both the fixing by the screw member 60 and the positioning by the pin portion 61a can be performed at the radial positions at which the screw member 60 and the pin portion 61a pass through the flange portion 33 and the second seal member 52. In this manner, the fixing by the screw member 60 and the positioning by the pin portion 61a can be performed at the same radial position. Therefore, it is easy to efficiently perform each work as compared with a case where the fixing by the screw member 60 and the positioning by the pin portion 61a are performed at different radial positions. For this reason, assembling workability of the motor 10 can be improved.

Further, according to the present preferred embodiment, the pin portion 61a is fitted into the hole portion 23b provided on the motor housing main body 20 and the hole portion 43b provided on the cover 40. For this reason, by the pin portion 61a, the motor housing main body 20 and the cover 40 can be positioned in the radial direction, and the motor housing main body 20 and the cover 40 can also be positioned in the circumferential direction. Further, according to the present preferred embodiment, at least one of the inner diameter D2 of the hole portion 23b provided on the motor housing main body 20 and the inner diameter D4 of the hole portion 43b provided in the cover 40 is smaller than the inner diameter D3 of the through hole 33b provided on the flange portion 33. For this reason, it is possible to employ a configuration in which the pin portion 61a is fitted with clearance to the through hole 33b of the flange portion 33 in a state where the pin portion 61a is press-fitted and fixed to at least one of the hole portion 23b of the motor housing main body 20 and the hole portion 43b of the cover 40. In this manner, assembling workability of the motor 10 can be further improved.

Further, according to the present preferred embodiment, the inner diameter D2 of the hole portion 23b provided on the motor housing main body 20 and the inner diameter D4 of the hole portion 43b provided on the cover 40 are smaller than the inner diameter D5 of the through hole 52b provided on the second seal member 52. For this reason, the inner diameter D5 of the through hole 52b of the second seal member 52 can be made relatively large. In this manner, the pin portion 61a can be easily inserted into the through hole portion 52b when the second seal member 52 is assembled while the pin portion 61a is fitted into each of the hole portions 23b and 43b to suitably position the motor housing main body 20 and the cover 40. Therefore, assembly workability of the motor 10 can be further improved.

Further, according to the present preferred embodiment, the inner diameter D2 of the hole portion 23b provided on the motor housing main body 20 and the inner diameter D4 of the hole portion 43b provided on the cover 40 are different from each other. For this reason, it is possible to employ a configuration in which the pin portion 61a is press-fitted and fixed to one of the hole portion 23b of the motor housing main body 20 and the hole portion 43b of the cover 40, and the pin portion 61a is fitted with clearance to the other one of the hole portion 23b of the motor housing main body 20 and the hole portion 43b of the cover 40. In this manner, the pin portion 61a can be easily fitted into the hole portion of one of the motor housing main body 20 and the cover 40 while the pin portion 61a is fixed to the other one of the motor housing main body 20 and the cover 40. Therefore, assembly workability of the motor 10 can be further improved.

Further, according to the present preferred embodiment, the second seal member 52 is made from metal. For this reason, it is easy to form the through hole 52b with respect to the second seal member 52 with high accuracy. In this manner, it is easy to suitably position the second seal member 52 by the pin portion 61a passing through the through hole 52b. Further, for example, unlike a case where the second seal member 52 is an O-ring, it is not necessary to provide a groove for fitting the second seal member 52.

Further, according to the present preferred embodiment, a pair of the positioning portions 61 are provided in a manner sandwiching the central axis J in the radial direction. For this reason, the motor housing main body 20, the stator housing 30, and the cover 40 can be more suitably positioned by the positioning portion 61.

Further, according to the present preferred embodiment, an end portion on the right side of the stator housing main body 31, that is, an end portion on the right side of the sealed portion 31b is disposed away from the lid portion 21 to the left side. For this reason, when the stator housing main body 31 is inserted into the cylindrical portion 22, the flange portion 33 can be brought into contact with the second seal member 52 and the second seal member 52 can be sandwiched between the flange portion 33 and the motor housing main body 20 before an end portion on the right side of the stator housing main body 31 comes into contact with the lid portion 21. In this manner, the second seal member 52 can be suitably brought into contact with the flange portion 33 and the motor housing main body 20. Therefore, a gap in the axial direction between the flange portion 33 and the motor housing main body 20 can be suitably sealed by the second seal member 52.

Further, according to the present preferred embodiment, in the cylindrical portion 22, an inner circumferential surface of the sealed portion 22b protrudes radially inward further than an inner circumferential surface of the flow path constituting portion 22a. For this reason, before the sealed portion 31b to which the first seal member 51 is attached is inserted into the sealed portion 22b of the cylindrical portion 22, the first seal member 51 can be prevented from rubbing against an inner circumferential surface of the flow path constituting portion 22a even if the first seal member 51 protrudes radially outward further than an outer circumferential surface of the sealed portion 31b. Therefore, the stator housing main body 31 to which the first seal member 51 is attached can be easily assembled with the motor housing main body 20. Further, damage to the first seal member 51 can be suppressed, and decrease in the sealing property by the first seal member 51 can be suppressed.

Further, according to the present preferred embodiment, an end surface on the left side of the motor housing main body 20 and an end surface on the right side of the second seal member 52 and the flange portion 33 entirely overlap each other when viewed in the axial direction. For this reason, a contact surface between the members can be easily made large, and the sealing property by the second seal member 52 can be further improved.

Further, according to the present preferred embodiment, the cover 40 has the bus bar through hole 42a through which the bus bar 74 passes. For this reason, it is possible to employ an assembling method in which the bus bar 74 is electrically connected to the stator 72 before the cover 40 is assembled, and the bus bar 74 is caused to pass through the bus bar through hole 42a when the cover 40 is assembled. In this manner, for example, the bus bar 74 is easily connected to the stator 72 as compared with a case where the cover 40 is integrally molded with the stator housing 30 as a single member.

Further, according to the present preferred embodiment, the connector portion 77 electrically connected to the rotation detection device 75 and fixed to the cover 40 outside the motor housing 11 is provided. The cover 40 has the accommodating portion 44 that accommodates the rotation detection device 75. In such a configuration, since the cover 40 is provided as a separate member from the stator housing 30, wiring between the rotation detection device 75 and the connector portion 77 can be easily performed as compared with a case where, for example, the cover 40 is integrally molded as a single member with the stator housing 30.

The present invention is not limited to the above-described preferred embodiment, and other structures and other methods may be employed within the scope of the technical idea of the present invention. The positioning portion may have any configuration as long as the motor housing main body and the cover can be positioned in the radial direction and the stator housing can be positioned in the radial direction with respect to the motor housing main body and the cover. The pin portion 61a of the above-described preferred embodiment may be press-fitted into the hole portion 43b of the cover 40 and may be fitted with clearance into the hole portion 23b of the motor housing main body 20. In this case, the inner diameter D4 of the hole portion 43b is smaller than the inner diameter D2 of the hole portion 23b. Further, in the above-described preferred embodiment, the pin portion 61a may be press-fitted into both the hole portion 23b and the hole portion 43b, or may be fitted with clearance into both the hole portion 23b and the hole portion 43b.

Figure 6:
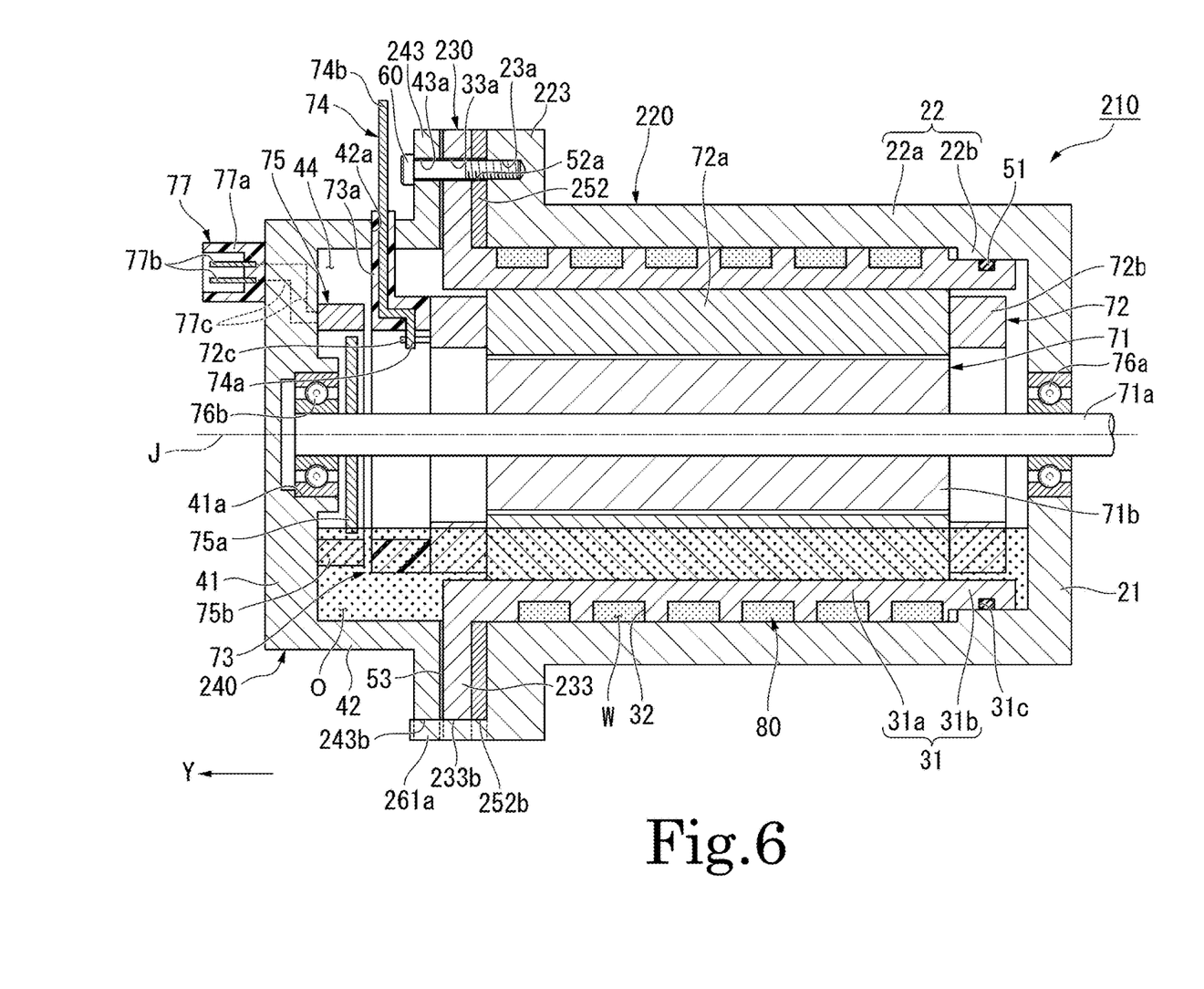
FIG. 6 is a cross-sectional view illustrating the motor according to another preferred embodiment.

The pin portion of the positioning portion may have, for example, a configuration like that of a pin portion 261a of a motor 210 shown in FIG. 6. As shown in FIG. 6, the pin portion 261a is provided in the motor housing main body 220. The pin portion 261a and the motor housing main body 220 are portions of the same single member. The pin portion 261a extends to the left from a radially outer circumferential edge portion of a main body flange portion 223 of the motor housing main body 220. The pin portion 261a penetrates a recess 252b provided on a second seal member 252 and a recess 233b provided in a stator housing 230 in the axial direction and is fitted into a recess 243b provided in the cover 240. The recess 252b is recessed radially inward from a radially outer circumferential edge portion of the second seal member 252. The recess 233b is recessed radially inward from a radially outer circumferential edge portion of a flange portion 233 of the stator housing 230. The recess 243b is recessed radially inward from a radially outer circumferential edge portion of a cover flange portion 243 of the cover 240. The pin portion 261a is fitted into the recess 233b.

According to the configuration of FIG. 6, the number of components of the motor 210 can be reduced as compared with a case where the pin portion 261a is separated from other members. For this reason, the number of assembling steps of the motor 210 can be further reduced. Note that the pin portion 261a may be provided on the cover 240. That is, the pin portion 261a and the cover 240 may be a portion of the same single member, and the pin portion 261a may be fitted into a recess provided on the motor housing main body 220. Further, in the configuration of FIG. 6, a through hole may be provided instead of each recess through which the pin portion 261a passes.

The positioning portion may be provided on the flange portion of the stator housing. The positioning portion does not need to have the pin portion. The configuration may be such that only one positioning portion is provided, or three or more positioning portions are provided.

The second seal member may have any configuration as long as the second seal member seals a gap in the axial direction between the motor housing main body and the flange portion of the stator housing further on the second side in the axial direction than the flow path. A material of the second seal member is not particularly limited. In the above-described preferred embodiment, the inner diameter D5 of the through hole 52b of the second seal member 52 may be the same as the inner diameter D4 of the hole portion 43b of the cover 40.

Figure 7:
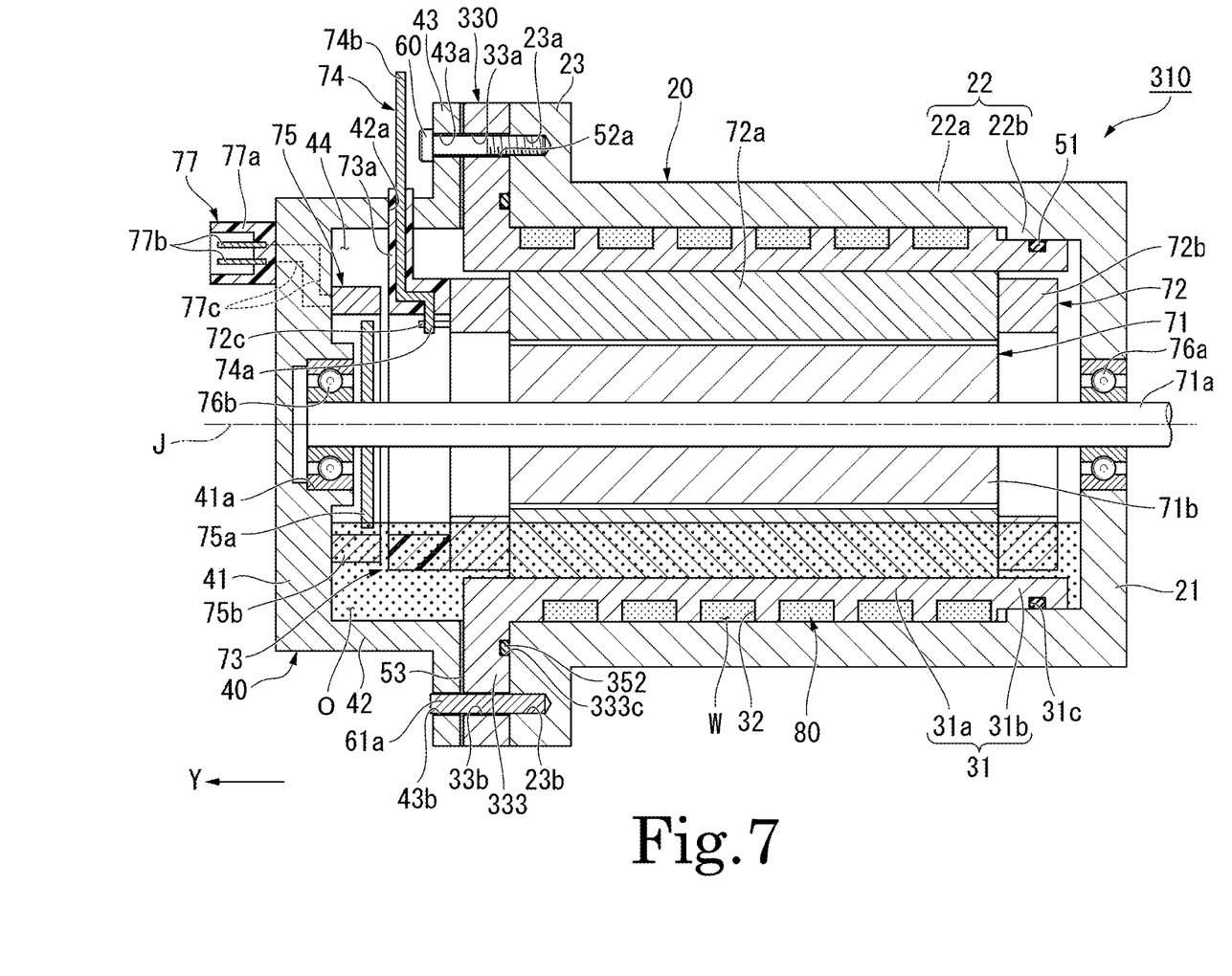
FIG. 7 is a cross-sectional view illustrating the motor according to still another preferred embodiment.

The second seal member may have a configuration like that of a second seal member 352 of a motor 310 shown in FIG. 7. As shown in FIG. 7, the second seal member 352 is an annular O-ring surrounding the central axis J. The second seal member 352 is fitted into, for example, a seal groove 333c provided on a stator housing 330. The seal groove 333c is recessed to the left side from a surface on the right side of a flange portion 333 of the stator housing 330. The seal groove 333c has, for example, an annular or substantially annular shape about the central axis J.

The motor housing main body may have any configuration as long as the motor housing main body has the cylindrical portion and the lid portion. The hole portion provided on the motor housing main body may be a hole penetrating the motor housing main body. In the preferred embodiment described above, the motor housing main body 20 does not need to have the main body flange portion 23. In this case, the second seal member 52 may seal a gap in the axial direction between an end portion on the left side of the cylindrical portion 22 and the flange portion 33.

The cover may have any configuration as long as the cover is located on the second side in the axial direction of the motor housing main body and holds the second bearing. The hole portion provided on the cover may be a hole that does not penetrate the cover and has a bottom portion. The cover does not need to have the accommodating portion. In the above-described preferred embodiment, the cover 40 may have a configuration of having only the top wall portion 41. That is, the cover 40 may have a flat or substantially flat shape expanding in the radial direction. In this case, for example, the fixing hole 43a and the hole portion 43b may be provided in a radially outer circumferential edge portion of the top wall portion 41.

The screw member for fixing the motor housing main body and the cover may be tightened into a female screw hole provided on the cover. The motor housing main body and the cover may be fixed by a member other than the screw member. The motor housing main body and the cover may be fixed by, for example, a rivet.

The stator housing may have any configuration as long as the stator housing has the stator housing main body and the flange portion. In the preferred embodiment described above, the inner diameter D3 of the through hole 33b of the flange portion 33 may be larger than the inner diameter D4 of the hole portion 43b of the cover 40.

The application of the motor to which the present invention is applied is not particularly limited. The motor may be mounted on a device other than the device mounted on a vehicle. The direction in which the central axis of the motor extends is not particularly limited, and may be the vertical direction or a direction inclined with respect to both the horizontal direction and the vertical direction. The configurations and the methods described above in the present description can be combined as appropriate within a scope in which no mutual contradiction arises.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a rotor having a shaft rotatable about a central axis;
a stator located radially outside the rotor;
a motor housing that accommodates the rotor and the stator therein; and
a first bearing and a second bearing that support the shaft rotatably about the central axis, wherein
the motor housing includes:
a motor housing main body that has a cylindrical portion located radially outside the stator and a lid portion located on a first side in an axial direction of the stator and holding the first bearing;
a cover that is located on a second side in the axial direction of the motor housing main body and holds the second bearing;
a stator housing that accommodates the stator therein and forms a flow path with an inner circumferential surface of the cylindrical portion in a radial direction;
a first seal member and a second seal member; and
a positioning portion for positioning the motor housing main body and the cover in the radial direction,
the stator housing includes:
a tubular stator housing main body that is located between the cylindrical portion and the stator in the radial direction and has the stator fixed to an inside of the stator housing main body; and
an annular flange portion that protrudes radially outward from the stator housing main body and is located between the motor housing main body and the cover in the axial direction,
the first seal member and the second seal member have an annular shape surrounding the central axis,
the first seal member seals a first in the radial direction between the cylindrical portion and the stator housing main body further on the first side in the axial direction than the flow path,
the second seal member seals a second gap in the axial direction between the motor housing main body and the flange portion further on the second side in the axial direction than the flow path,
the positioning portion positions the stator housing in the radial direction with respect to the motor housing main body and the cover, and
an end portion on the first side in the axial direction of the stator housing main body is arranged on the second side in the axial direction with a space from the lid portion.

2. The motor according to claim 1, wherein a pair of the positioning portions are provided by sandwiching the central axis in the radial direction.

3. The motor according to claim 1, wherein
the cylindrical portion includes:
a flow path constituting portion that forms the flow path in the radial direction with an outer circumferential surface of the stator housing main body; and
a sealed portion where the first gap in the radial direction formed with the stator housing main body is sealed by the first seal member, the sealed portion being connected to the first side in the axial direction of the flow path constituting portion, and
an inner circumferential surface of the sealed portion protrudes radially inward further than an inner circumferential surface of the flow path constituting portion.

4. The motor according to claim 1, wherein an end surface on the second side in the axial direction of the motor housing main body and an end surface on the first side in the axial direction of the second seal member and the flange portion entirely overlap each other when viewed in the axial direction.

5. The motor according to claim 1, wherein the motor housing includes a third seal member that seals a third gap in the axial direction between the flange portion and the cover.

6. The motor according to claim 1, further comprising
a bus bar electrically connected to the stator inside the motor housing, wherein
the cover has a bus bar through hole through which the bus bar passes.

7. The motor according to claim 1, further comprising:
a rotation detection device configured to detect rotation of the rotor; and a connector portion that is electrically connected to the rotation detection device and is fixed to the cover outside the motor housing, wherein the cover has an accommodating portion that accommodates the rotation detection device.

8. The motor according to claim 1, wherein the cover covers the entire rotor from the second side in the axial direction.

9. A drive device configured to be mounted on a vehicle and to rotate an axle, the drive device comprising:
the motor according to claim 1; and
a transmission device that is connected to the rotor and configured to transmit rotation of the rotor to the axle.

10. The motor according to claim 1, wherein the positioning portion positions the second seal member with respect to the motor housing main body and the cover.

11. The motor according to claim 10, wherein the second seal member is made from metal.

12. The motor according to claim 1, wherein
the positioning portion includes a pin portion extending from the motor housing main body to the cover, and
the pin portion penetrates the flange portion and the second seal member in the axial direction.

13. The motor according to claim 12, wherein the motor housing main body and the cover are fixed to each other by a screw member axially penetrating a fixing hole provided on the flange portion and a fixing hole provided on the second seal member.

14. The motor according to claim 12, wherein
the pin portion is fitted into a hole portion provided on the motor housing main body and a hole portion provided on the cover,
the flange portion and the second seal member have a through hole through which the pin portion passes in the axial direction, and
at least one of an inner diameter of the hole portion provided on the motor housing main body and an inner diameter of the hole portion provided on the cover is smaller than an inner diameter of the through hole provided on the flange portion.

15. The motor according to claim 14, wherein the inner diameter of the hole portion provided on the motor housing main body and the inner diameter of the hole portion provided on the cover are smaller than an inner diameter of the through hole provided on the second seal member.

16. The motor according to claim 14, wherein the inner diameter of the hole portion provided on the motor housing main body and the inner diameter of the hole portion provided on the cover are different from each other.

17. A motor, comprising:
a rotor having a shaft rotatable about a central axis;
a stator located radially outside the rotor;
a motor housing that accommodates the rotor and the stator therein; and
a first bearing and a second bearing that support the shaft rotatably about the central axis, wherein
the motor housing includes:
a motor housing main body that has a cylindrical portion located radially outside the stator and a lid portion located on a first side in an axial direction of the stator and holding the first bearing;
a cover that is located on a second side in the axial direction of the motor housing main body and holds the second bearing;
a stator housing that accommodates the stator therein and forms a flow path with an inner circumferential surface of the cylindrical portion in a radial direction;
a first seal member and a second seal member; and
a positioning portion for positioning the motor housing main body and the cover in the radial direction,
the stator housing includes:
a tubular stator housing main body that is located between the cylindrical portion and the stator in the radial direction and has the stator fixed to an inside of the stator housing main body; and
an annular flange portion that protrudes radially outward from the stator housing main body and is located between the motor housing main body and the cover in the axial direction,
the first seal member and the second seal member have an annular shape surrounding the central axis,
the first seal member seals a first gap in the radial direction between the cylindrical portion and the stator housing main body further on the first side in the axial direction than the flow path,
the second seal member seals a second gap in the axial direction between the motor housing main body and the flange portion further on the second side in the axial direction than the flow path,
the positioning portion positions the stator housing in the radial direction with respect to the motor housing main body and the cover,
the positioning portion includes a pin portion extending from the motor housing main body to the cover,
the pin portion penetrates the flange portion and the second seal member in the axial direction,
the pin portion is fitted into a hole portion provided on the motor housing main body and a hole portion provided on the cover,
the flange portion and the second seal member have a through hole through which the pin portion passes in the axial direction, and
at least one of an inner diameter of the hole portion provided on the motor housing main body and an inner diameter of the hole portion provided on the cover is smaller than an inner diameter of the through hole provided on the flange portion.

* * * * *